United States Patent [19]
McDiarmid et al.

[11] 3,992,801
[45] Nov. 23, 1976

[54] FISHING HOOK ASSEMBLY

[76] Inventors: John C. McDiarmid, 706 E. Donaldson Ave.; Darrell F. Chapman, 730 Green St., both of Raeford, N.C. 28376

[22] Filed: June 23, 1975

[21] Appl. No.: 589,133

[52] U.S. Cl. ............................................. 43/44.8
[51] Int. Cl.² ...................................... A01K 83/06
[58] Field of Search ................. 43/44.2, 44.4, 44.6, 43/44.8

[56] References Cited
UNITED STATES PATENTS

| | | | |
|---|---|---|---|
| 772,807 | 10/1904 | Ketchum | 43/44.2 |
| 2,330,517 | 9/1943 | Rigandi | 43/44.8 |
| 3,600,838 | 8/1971 | Bablick | 43/44.6 |

FOREIGN PATENTS OR APPLICATIONS

| | | | |
|---|---|---|---|
| 527,469 | 10/1940 | United Kingdom | 43/44.8 |

*Primary Examiner*—Warner H. Camp
*Attorney, Agent, or Firm*—Mills & Coats

[57] ABSTRACT

A fishing hook assembly in which there is provided at least two fishing hooks disposed in laterally spaced apart relationship, with each hook being supported by a portion of a shank separated from an adjacent shank having a hook associated therewith. The fishing hook assembly further includes a bait holding structure that is carried by the fishing hook assembly and is adapted to receive and hold the particular bait generally between the laterally spaced hooks and associated laterally spaced shanks. A first species comprises a safety pin bait holding device secured to the front of the fish hook assembly and adapted to penetrate through the body of the fish and to be securely fastened to hold the bait thereabout in a position again generally between the laterally spaced shanks and hooks. In a second basic species, there is provided a cross pin bait holding assembly that is supported by the fish hook assembly and includes a front attaching safety pin and a rear cross pin that is adapted to extend transversely across the fish hook assembly and to penetrate completely through the body of the fish and to hold that portion of the bait generally between the laterally spaced hooks and shanks.

4 Claims, 7 Drawing Figures

FISHING HOOK ASSEMBLY

The present invention relates to fishing tackle and to devices used in fishing, and more particularly to live (or artificial) bait fishing hook assembly having a bait carrying structure incorporated therein that is completely independent of any hooks associated with said fishing hook assembly.

BACKGROUND OF THE INVENTION

Live bait fishing, as contrasted to artificial plugs, lures or worms, has long been a preferred and desirable way of fishing. Even today with the advent of many types of artificial bait, live bait fishing remains the preference of many skilled and experienced fishermen since such tends to be successful and the most natural way of fishing.

Success with live bait fishing, however, is not always present and even sometimes difficult to achieve. Probably the principal reason for such is that at least some live bait fishing tackle has not always been designed properly and adequately for achieving good results with live bait. For example, live bait has traditionally been placed on the hooks themselves and the user thereof has often been faced with the problem of "throwing off" the bait in the casting process. In addition, in such practice, fish sometimes are able to remove the bait from the hooks relatively easy without being "hooked" themselves.

Moreover, while fishing hooks may be practical for live worms, the conventional live bait tackle is not designed to properly support various sizes and types of live bait such as minnows, frogs, crickets, etc. But even more important, such live bait fishing tackle is not designed to support the live bait in a natural live like posture, and to dynamically pull the bait through the water in a natural upright moving or swimming fashion. Further, with conventional fishing hooks, there is little flexibility provided and often it is required that the size of the fishing hook be changed when the bait size varies significantly.

SUMMARY OF THE INVENTION

The present invention presents a highly effective and reliable live (or artificial) bait fishing tackle that is adapted to firmly hold and support in a dynamically balanced fashion various sizes and types of bait independently of at least two hooks associated with the tackle. The fishing tackle disclosed herein is in the form of a dual fishing hook assembly including a pair of spaced apart hooks supported and integrally constructed with a pair of laterally spaced shanks. The shanks extend forwardly to where at a certain point they merge together to form an integral shank structure which includes an eyelet fixed to the forward end therefor for attachment to a fishing line. The fishing hook assembly further includes bait holding means that is completely independent of the hooks and generally disposed such that the bait is supported in an upright live appearing posture between the laterally spaced hooks and shanks. Consequently, it is thusly seen that the bait is held generally between the hooks of the fishing hook assembly wherein the fishing hook assembly is designed to dynamically move through the water with the bait secured and held in a proper upright position that gives the appearance that the bait is both real and alive. In addition, the fishing hook assembly, particularly the shank portions, are designed to give significant flexibility to the hook assembly and thereby allow the relative position of the hooks with respect to the bait to be selectively altered to present the particular appearance and arrangement of the fishing hook assembly desired. It also should be pointed out with this type of design the fishing hooks are completely free and unobstructed and, therefore, are opened so as to facilitate "hooking" the fish in response to an attack on the bait carried by the fishing hook assembly.

It is, therefore, an object of the present invention to provide an improved live bait fishing hook assembly that will firmly support and hold the bait in a proper position and posture about the fishing hook assembly and also will act as a very effective live (or artificial) bait fishing tackle when being used.

Still a further object of the present invention is to provide a live bait fishing tackle in the form of a fishing hook assembly that is adapted to firmly support, hold and accommodate various sizes and types of bait.

Still a further object of the present invention is to provide a fishing hook assembly that is designed to incorporate a significant degree of flexibility therein such that the position of the hooks may be adjusted relative to the bait being independently held and supported thereby by flexing or adjusting one or more of the shanks that support the respective hooks of the fishing hook assembly.

Another object of the present invention is to provide a live bait fishing tackle in the form of a fishing hook assembly that is dynamically designed and balanced to hold and support a particular live bait in a live appearing position and posture, and when pulled through the water during the fishing activity to cause the live bait being carried and supported thereby to appear live and real in a moving or swimming fashion in order to ideally simulate a like uncontrolled specimen of that bait.

A further object of the present invention is to provide a live bait fishing tackle in the form of a fishing hook assembly species wherein the adjustment of the fishing hooks with respect to the bait is maximized by allowing the fishing hooks to be adjusted longitudinally with respect to the bait being carried by the fishing hook assembly and allowing the angle of the hooks to be adjusted relative to the longitudinal axis of the same fishing hook assembly. In addition, with regard to this object, the particular fishing hook assembly being referred to also includes a pair of shank assemblies that can be freely flexed a significant degree and accordingly, the degree of adjustment as referred to above is substantially increased.

Other objects and advantages of the present invention will become apparent from a study of the following description and the accompanying drawings which are merely illustrative of the present invention.

BRIEF DESCRIPTION OF THE DRAWINGS

With further reference to the drawings, particularly FIGS. 1-4, there is shown therein the fishing hook assembly of the present invention, the particular fishing hook assembly shown therein being of a first species and indicated generally by the numeral 10. Viewing the fishing hook assembly 10 in detail, it is seen hat the same comprises a pair of generally elongated shanks 12 and 14 that include hooks 16 and 18 integrally formed therewith about the rear portions thereof. As illustrated in FIGS. 2 and 4, the shanks 12 and 14 extend forwardly from the hooks 16 and 18 to a point where the shanks merge together to form a common shank portion 20. Although various means may be used in constructing such a shank assembly such as the entire shank assembly being one separate piece of construction, the fishing hook assembly 10 of the present invention may be constructed of two separate fishing hooks wherein he shanks are particularly bent, as illustrated in FIGS. 2 and 4, such that the front portions thereof may be soldered, tied or otherwise suitably fused or connected together to form the common shank portion 20.

Figure 1:
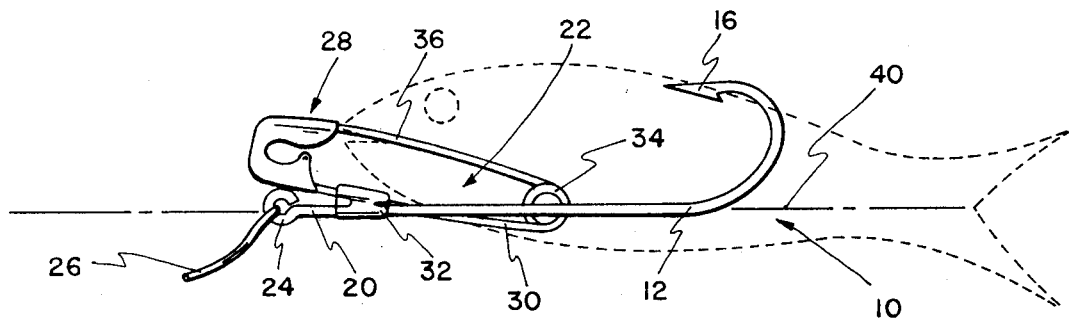
FIG. 1 is a side elevational view of a first species of the fishing hook assembly of the present invention.

Defined between the laterally spaced shanks 12 and 14 is a bait receiving and holding area 22 that is adapted to receive various types of both life and artificial bait therebetween.

Formed about the front end of the common shank portion 20 is an eyelet 24 that is adapted to be suitably connected to a fishing line 26.

Secured to the fishing hook assembly 10 generally forwardly of the hooks 16 and 18 is a safety pin type bait holding means 28, the safety pin bait holding means being disposed in a generally vertical plane generally midway between the respective shanks and hooks forming the fishing hook assembly. Viewing this in detail, it is seen that the safety pin type bait holding means 28 comprises a back pin 30 that is appropriately threaded through a collar 32 that is in turn securedly fastened in a suitable manner about the common shank portion 20 of the fishing hook assembly. The safety pin type bait holding means 28 further includes a rear end coil spring portion 34 in which a pin or needle-like member 36 extends forwardly and generally upwardly therefrom where the tapered or pin end thereof is adapted to be securedly fastened and held within a pin fastener 38.

Figure 3:
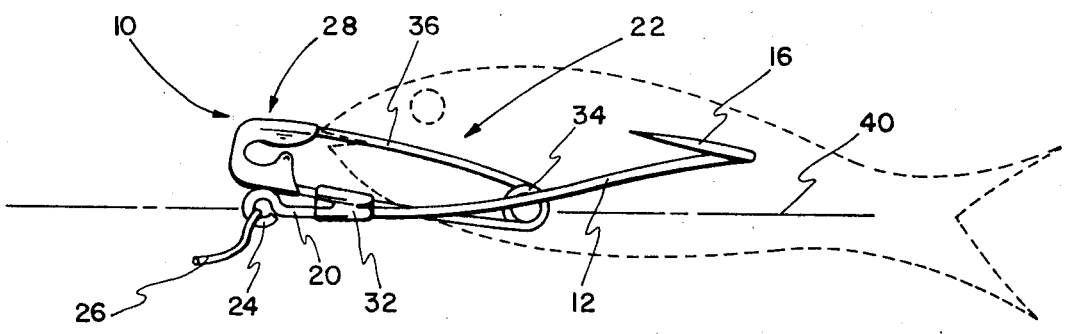
FIG. 3 is a side elevational view of the same first species of the fishing hook assembly of the present invention with the angle of the hooks being disposed in a different position relative to the bait in comparison with the fishing hook assembly shown in FIGS. 1 and 2.

As viewed in FIGS. 1 and 3, the safety pin type bait holding means 28 is disposed at a slight incline to a horizontal plane that generally extends horizontally as viewed in FIGS. 1 and 3 and is represented by the broken line 40.

Figure 2:
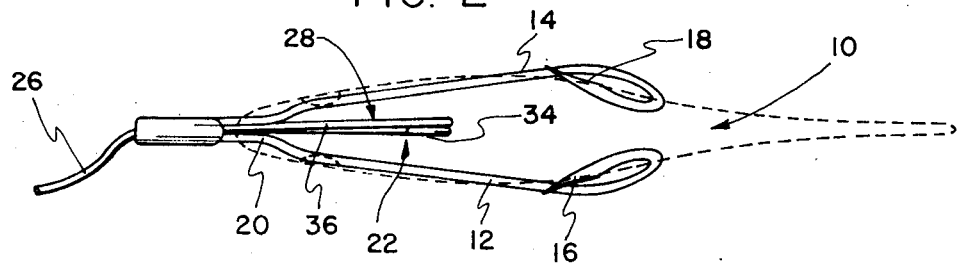
FIG. 2 is a top plan view of the fishing hook assembly shown in FIG. 1.
Figure 4:
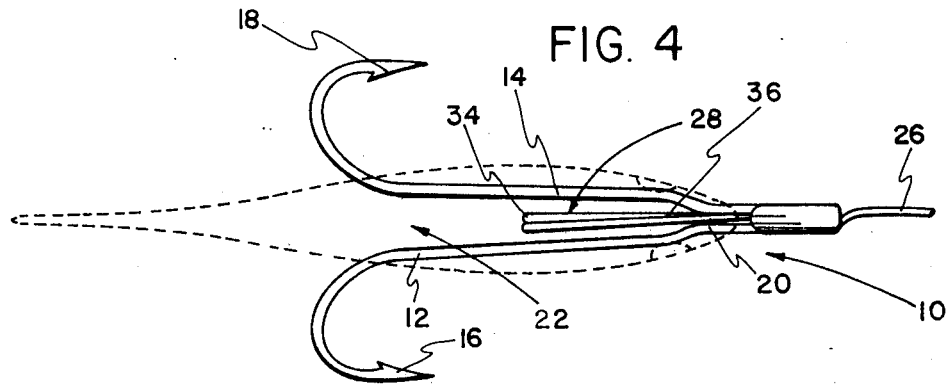
FIG. 4 is a top plan view of the fishing hook assembly shown in FIG. 3.

In operation, the pin portion 36 of the safety pin bait holding means 28 is removed from the pin fastener 38 and the pin 36 is placed into the body of the bait and appropriately pushed therethrough such that the bait, as indicated in dotted lines in FIGS. 1-4, is held firmly between the hooks 16 and 18 at a position where the hooks 16 and 18 lie adjacent the body of the bait at any appropriate angle thereto such as illustrated in either FIG. 2 or FIG. 4. For example, in the case of a minnow as illustrated in FIGS. 1-4, the piercing end of the pin 36 is inserted into the rear lower portion of the minnow and pushed generally upwardly and forwardly therefrom to where the pin extends completely through the minnow and can be firmly fastened in the pin fastener 38. Consequently, the minnow is then firmly held between the hooks completely independent thereof and in an upright posture. The fishing hook assembly 10 is particularly designed to move through the water in an upright fashion as illustrated in FIGS. 1 and 2.

Figure 5:
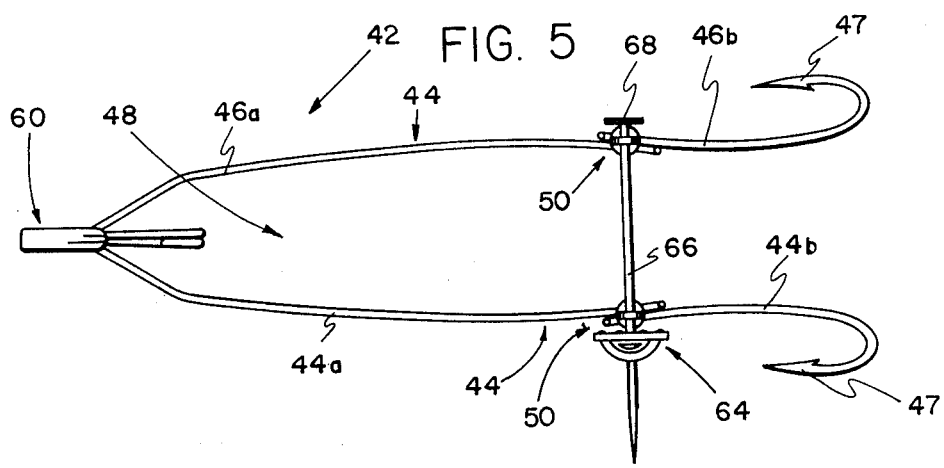
FIG. 5 is a top plan view of a second species of the fishing hook assembly of the present invention.
Figure 6:
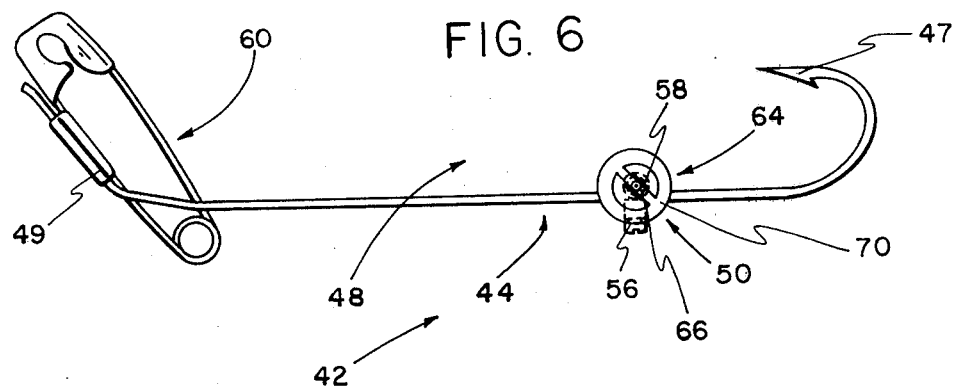
FIG. 6 is a side elevational view of the same fishing hook assembly shown in FIG. 5.
Figure 7:
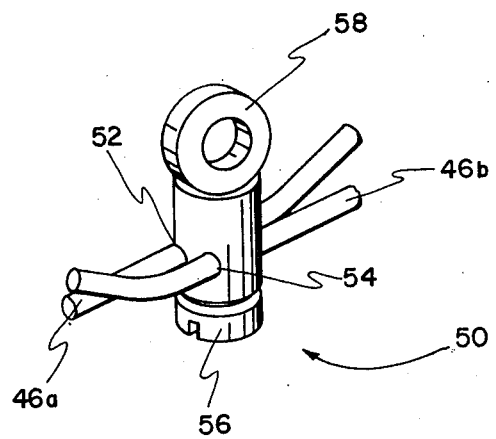
FIG. 7 is a fragmentary perspective view of a shank holder adapted to receive respective first and second members of either one of the shank assemblies shown in the species of FIG. 5.

Turning now to FIGS. 5-7 and the second species of the fishing hook assembly of the present invention, it is seen that this species is indicated generally by the numeral 42. As will become apparent from the subsequent disclosure relative to this species, the design of this species provides a very flexible and adjustable fishing hook assembly wherein the position of the respective hooks of the fishing hook assembly and the angle of the fishing hooks can be adjusted relative to the position of the bait being carried thereby.

Viewing the second species 42 in greater detail, the same comprises a pair of shank assemblies 44 and 46, each shank assembly being disposed in lateral spaced apart relationship with respect to the other so as to define a bait receiving and holding area 48 therebetween. Each shank assembly includes first and second respective shank members, the shank members being referred to as 44a, 44b, 46a and 46b. The rearmost disposed shank members 44b and 46b include hooks 47 integrally constructed therewith.

In the case of each shank assembly 44 and 46, the respective shank members comprising the same are adjustable such that the rearmost shank member 44b or 46b may be moved from left to right (as viewed in FIG. 5) or the same shanks may be rotated about the respective axis of each shank in order to adjust the angle of the hooks 47 with respect to any bait that may be held and supported between the respective shank assemblies.

To provide for this adjustment, there is provided connecting means, indicated generally by the numeral 50, operatively interconnecting respective shank members 44a and 44b, or 46a and 46b. With reference to the connecting means 50, it is seen that the same includes a generally cylindrical shank receiving member in the form of a short circular stub shaft in which there is bored at least one or as in the case illustrated two openings 52 and 54 (FIG. 7) to accommodate any two respective shank members. Openings 52 and 54 provided for in each of the connecting means 50 allow the respective shank members 44a and 44b or 46a and 46b to be adjusted therein. The connecting means in the form of a shank receiving member, as illustrated in FIG. 7, is provided with a set screw 56 which is adapted to be screwed tightly adjacent the shank members to hold them in the desired adjusted position. Alternatively, the connecting means 50 could be provided with an Allen screw for such adjustment instead of the set screw 56 shown in the drawings.

In order to support the bait completely independent of the hooks 47, the fishing hook asssembly 42 is provided with bait holding and receiving means and this bait holding and receiving means is provided at the front of the shank assembly and at some point intermediately spaced between the front of the fishing hook assembly and the position of the fishing hooks 47. In particular, the bait holding and receiving means comprises a front bait attaching means indicated generally by the numeral 60 and in the form of a safety pin type holder as described in discussing the first species shown in FIGS. 1–4. For this reason, the details of the front attaching means 50 will not be dealt with here because the structure of such a bait holding pin has already been described in connection with the first species. It should be pointed out, however, that the front attaching means 60 for the type of assembly shown in FIG. 5 is disposed at more of an incline than the bait holding means described in FIGS. 1–4. In addition, the front attaching means 60 is secured to a common portion of the shank assemblies 44 and 46 by a rubber collar 49 or other suitable attaching means. In view of this, it is seen that the shank assemblies 44 and 46 merge together about a front portion of the fishing hook assembly 42.

Continuing to refer to the bait holding and receiving means, there is provided a cross pin bait holding assembly 64 that is disposed rearwardly of the front attaching means 60. Cross pin belt holding assembly 64 comprises a cross pin means 66 that extends transversely across the shank assemblies 44 and 46 through respective eyelets 58 that are disposed on the top portion of the connecting means or shank receiving members 50. Disposed across one end of the cross pin means 66 is a cross stop 68 that lies outwardly of the respective eyelet 58 and is accordingly held outwardly thereof. The cross pin bait holding assembly 64 further includes a locking tab 70 that is adapted to be axially placed on the tapered or pin end portion of the cross pin means 66 outwardly of the adjacently respective eyelet 58. As viewed in FIG. 5, it is seen that when the locking tab means 70 is appropriately placed, the shank assemblies 44 and 46 are constrained to stay within the lateral spaced defined and bounded by the cross stop 68 and the locking tab means 70.

One of the important feature of the second species resides in the provision of a fishing hook assembly that is flexible enough to be readily adjusted to accommodate various types and sizes of both artificial and life bait. In this regard, the shank assemblies 44 and 46 are constructed so as to be substantially flexible in order that the user thereof can spread or close the shank assemblies with respect to each other and then by placing the locking tab 64 at the appropriate position on the cross pin means 66 the shank assemblies 44 and 46 can be constrained from moving or being urged further outwardly.

In use, the bait, as illustrated in FIG. 6, is attached through the front throat area by the ront attaching means 60, while the cross pin means 66 is extended transversely through the intermediate body area of the bait so as to firmly hold the same in place during the fishing operation. The fishing hook assembly 42 of the second species is also designed to support the bait in an upright posture while being pulled through the water and to give a "live action" to the bait as it moves through the water.

From the foregoing specification, it is seen that the two species of the fishing hook assembly of the present invention is provided with substantial flexibility that allows the fishing hook assembly to be adjusted to a desired configuration to accommodate the various types and sizes of life and artificial baits that may be used. Species two, shown in FIGS. 5 and 6, is substantially flexible and adjustable inasmuch as the position of the hooks 47 can be adjusted both forwardly and rearwardly as viewed in FIG. 5, and the angle of the hooks 47 can be rotated about the axis of the respective shanks thereof so as to adjust the angle of the respective hooks with respect to the position of the bait therein. In addition, both species disclosed herein are particularly designed to carry the bait in an upright and live appearing posture to simulate the particular bait in a fashion that truly reflects the manner in which the bait would move through the water in a free and uncaptive environment. Consequently, both species are designed to increase the effectiveness of a fishing tackle of the general type described and disclosed herein.

The terms "upper", "lower", "forward", "rearward", etc., have been used herein merely for the convenience of the foregoing specification and in the appended claims to describe the fishing hook assembly and its parts as oriented in the drawings. It is to be understood, however, that these terms are in no way limiting to the invention since the fishing hook assembly may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:
1. A fishing hook assembly comprising:
 a. a pair of shank assemblies extending in laterally spaced apart relationship so as to define a bait receiving and holding area generally between said shank assemblies;
 b. each shank assembly including first and second independent and separate shank members wherein each of said shank assemblies includes at least one fish hook associated therewith;
 c. connecting means interconnecting said first and second shank members of each shank assembly, said connecting means including a shank receiving member means for receiving and holding each respective pair of first and second shank members of each shank assembly, each shank receiving member including opening means for adjustably receiving said first and second shank members therein and means for selectively securing said first and second shank members within said shank receiving member such that the shank members may be securedly held therein relative to each other;
 d. bait holding means operatively associated with said fish hook assembly for holding a particular bait generally between said shank assemblies and in the bait receiving and holding areas defined therebetween; and
 e. said bait holding means including front attaching means disposed about the end of said fish hook assembly opposite the end of said hooks for attaching the particular bait thereat, and a cross pin bait holding assembly means normally disposed transversely across said shank assemblies and through the body of the particular bait disposed therebetween, said cross pin bait holding assembly means including a removable cross pin means adapted to penetrate through the body of said bait being disposed in the bait holding and receiving area and to hold that portion of the bait about the fish hook assembly.

2. The fishing hook assembly of claim 1 wherein said cross pin bait holding assembly includes eyelet means associated with each of the at least two shank holding members for receiving said cross pin means therethrough, and wherein said cross pin means includes an elongated needle like member having a tapered pin end, and wherein said elongated needle like member includes a cross stop fixed to the end opposite the tapered pin end, and wherein said cross pin bait holding assembly includes a locking tab means adapted to be removably secured to a portion of the cross pin means opposite the cross stop such that the cross stop and locking tab means are disposed outwardly of said eyelet means and lateral movement of said shank assemblies is accordingly limited.

3. The fishing hook assembly of claim 2 wherein said front attaching means of said bait holding means comprises a safety pin secured to the end of said fish hook assembly opposite said hooks and disposed in a vertical plane generally between said pair of shank assemblies.

4. The fishing hook assembly of claim 1 wherein said first and second shank members of each shank assembly assumes generally front and rear positions with the rearmost shank member having said at least one hook associated therewith; and wherein said front shank members of said shank assemblies merge forwardly together to form a common shank portion of said fish hook assembly and include a line attaching eyelet extending from the forwardmost portion of said common shank portion of the fish hook assembly.

* * * * *